Figure 1:
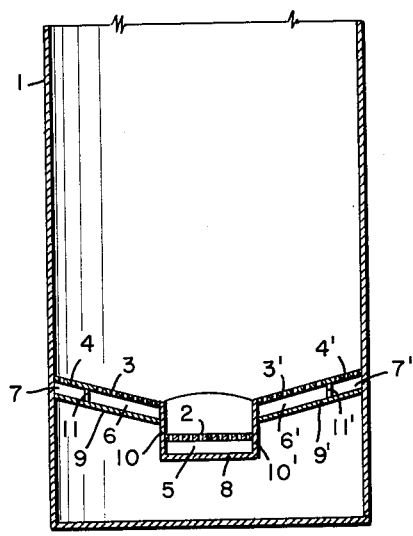

June 9, 1964     A. I. WESSELINGH     3,136,531
MIXING PULVERULENT MATERIALS
Filed Feb. 27, 1962

INVENTOR
ANTONIUS I. WESSELINGH
BY Oswald H. Milmore
HIS ATTORNEY

United States Patent Office 3,136,531
Patented June 9, 1964

3,136,531
MIXING PULVERULENT MATERIALS
Antonius I. Wesselingh, The Hague, Netherlands, assignor to Shell Oil Company, New York, N.Y., a corporation of Delaware
Filed Feb. 27, 1962, Ser. No. 175,975
Claims priority, application Great Britain Mar. 27, 1961
9 Claims. (Cl. 259—36)

The invention relates to mixing or homogenizing pulverulent materials by confining the same within a bunker which has a porous floor and passing aerating gas, such as air, upwards through the said floor. The term "porous" is used herein to denote the presence of many passages which can be traversed by the gas and are distributed, such as perforations formed or punched in a solid metal plate or passages which occur in naturally porous material, such as sintered metal or ceramic.

It has been heretofore proposed to mix pulverulent materials by subjecting them to an ascending fluidizing gas stream while stirring the materials mechanically. It was further proposed to avoid the inconvenience of mechanical stirrers and improve the mixing by aerating different parts of the material with different intensities and varying the rates of gas flow in various regions in accordance with an indexing pattern. For example, it was proposed to aerate only a part of the body of materials to the extent required to effect fluidization, i.e., to a degree such that the said part of the body of material is completely supported by the gas stream producing the aeration, the remaining part of the body of materials being aerated to a smaller degree; in order to effect different degrees of aeration in different zones of the said body the floor of the bunker was subdivided into sections to which aerating gas was supplied at different rates or velocities, and indexing means were provided, e.g., means for causing flow controllers to operate in a cycle, so that a complete sequence of indexing movements covers the whole mass of material. Such an arrangement necessitates the use of valve and control means to index the fluidized zone.

One of the objects of the invention is to provide a mixing method and apparatus which employs selective fluidization of the materials being mixed without the need to index the fluidized zone.

According to the present invention there is provided a method of mixing pulverulent materials contained in a bunker with a porous floor through which aerating gas can be supplied for aerating the materials, characterized in that the aeration is such that an intermediate zone of the body of materials extending substantially across the bunker and throughout the depth thereof is fluidized, while contiguous zones on either side of the intermediate zone are aerated to a lesser degree.

When mixing materials by the method of the invention the materials in the intermediate zone rise and spill over on to the contiguous, less intensely aerated zones the aeration of which decreases the degree of compaction of the materials therein (as opposed to fluidizing them), so that they readily flow down and into the lower region of the intermediate zone, whereby a continued circulation of materials within the complete body thereof is produced. This circulation produces highly efficient mixing or homogenization of the materials. Preferably the horizontal area of said intermediate section is about one-sixth to one-third of the cross-sectional area of the bunker. By keeping this area small the consumption of high-pressure fluidizing gas is minimized.

To avoid the formation of "dead" zones of unmixed materials at regions of the body of materials remote from the intermediate zone, relatively small side zones also contigous with the aforesaid side zones but remote from the intermediate zone may also be aerated to a degree sufficient to provide fluidization thereof.

According to the present invention there is also provided mixing apparatus for pulverulent materials comprising a bunker with a porous floor divided into sections through which aerating gas can be supplied at different velocities for aerating the materials, the floor being divided into an intermediate section (which may be a single section or a band of sections) extending substantially across the bunker to which the gas can be supplied at a velocity sufficient to fluidize an intermediate zone of the material immediately above that section or band, and side sections (which may be single sections or bands of sections) which can be supplied with lower-velocity gas to aerate zones of the materials above said side sections or bands to a lesser degree.

The intermediate floor section is preferably disposed centrally and extends the full distance across the bunker, and the floor of the latter is conveniently circular in plan view. Substantially segment shaped sections of the floor remote from the central section and bounded by chords parallel to the latter may also be arranged for the supply of high velocity gas to fluidize relatively small zones of the material remote from the intermediate fluidized zone, so as to prevent the formation of dead spaces in the bunker.

A material outlet of the bunker may be arranged in the sidewall thereof at one end or both of the intermediate floor section and the intermediate floor section arranged to have a high point from which the floor section slopes down towards the outlet or outlets at a level lower than the high point, and the side floor sections arranged to slope laterally down to the intermediate section, so that the bunker may readily be emptied after mixing of the materials.

The intermediate section can be formed as a trough of a depth increasing towards the outlet, whereas the side sections can be planar and slope down towards the intermediate section. The side walls of this trough will normally not be porous.

With such arrangement the mixed materials while still aerated during the emptying of the bunker tend to flow towards the outlet from all parts of the bunker. It is thus unnecessary to provide mechanical means to agitate the mixed materials during discharge from the bunker.

Figure 2:
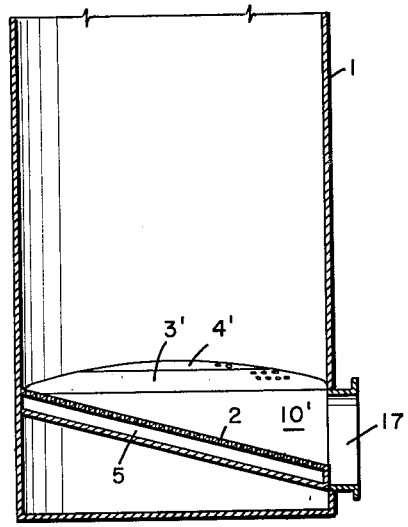
Figure 3:
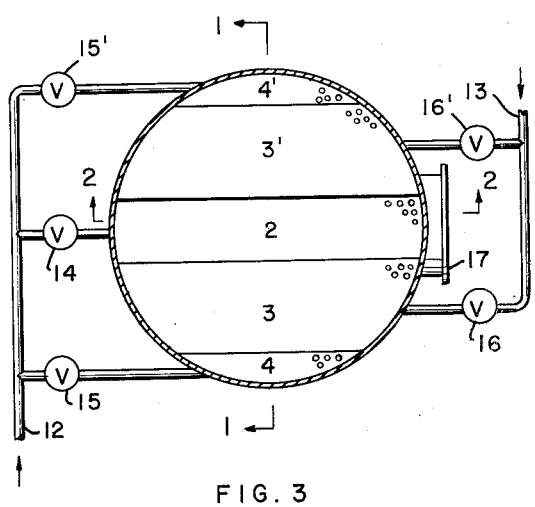
Figure 4:
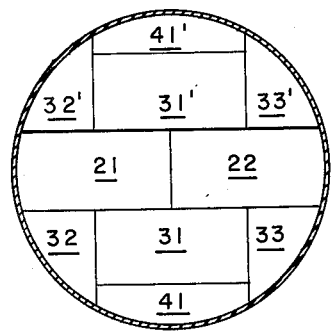

One embodiment of the invention will now be described with reference to the accompanying drawing in which:
FIGURE 1 shows a vertical section of a mixing bunker, taken along the line 1—1 of FIGURE 3,
FIGURE 2 shows a vertical section of the bunker taken along the line 2—2 of FIGURE 3,
FIGURE 3 shows a horizontal section through the bunker, and
FIGURE 4 shows a plan view of a somewhat modified arrangement of the bottom of the bunker.

The bunker of circular horizontal cross-section has a cylindrical outer wall 1 and a floor, the various sections of which indicated in the drawing at 2, 3, 3', 4 and 4' are constituted by a suitable porous medium such as porous or perforated ceramic tiles, cloth, wire-mesh screen, porous or perforated metal or porous or perforated plastic material. Each section is provided with its own gas plenum chamber, arranged below the porous medium, as indicated at 5, 6, 6', 7, 7', and defined by imperforate walls, lower walls 8, 9, 9', vertical trough walls 10, 10' and vertical partitions 11, 11'. Gas supply pipes 12 and 13, separately valved by valves 14, 15, 15' and 16, 16', respectively, are connected to the various plenum chambers. The bunker has an outlet opening 17.

The floor comprises three sections: An intermediate section, constituted by section 2 and forming a diametral strip, e.g., flat, of constant width, extending full way across the bunker; and two segment-shaped side sections, which bound the intermediate section and are constituted by the sub-sections 3, 4 and 3', 4', respectively, which may likewise be flat. The intermediate section is situated at a lower level than the remaining sections and slopes down towards the outlet opening 17, which is situated in the side wall of the bunker at the lower end of the section 2. The two side sections slope down towards the intermediate section, the parallel inner edges of the side sections being substantially horizontal and at a level not below, e.g., the same as the higher end of the intermediate section. The imperforate walls 10, 10' thereby are approximately triangular (FIGURE 2) and form the side wall of a trough.

In operation, the material may be charged in any manner, e.g., from the top while air is flowing through the pipes 12 and 13. During the mixing operation air is supplied to the plenum chambers beneath the various sections of the floor. The air for the intermediate section 2 is supplied via the pipe 12 and valve 14 at such a rate that the pulverulent material above this section is brought to fully fluidized conditions whereas the air for section 3 and 3' is supplied via the pipe 13 and valves 16, 16' at a lower rate so that the material above the latter sections is aerated to a lesser degree, i.e., is not fully fluidized. As a consequence, the materials in the intermediate zone of the body of material rise and spill over to the side zones, and the body of material in the side zones flows down laterally into the lower regions of the intermediate zone, so that a constant circulation of materials is produced. To avoid the formation of "dead" zones of unmixed materials at the outermost regions of the body of materials remote from the intermediate zone, the sub-sections 4, 4' may optionally also be supplied via the pipe 12 and valves 15, 15' with air at a rate sufficient to provide fluidization within said regions. The sub-sections consume only a small amount of gas, due to their limited areas.

A highly efficient mixing or homogenization of the materials may be obtained in this way. The actual air velocities above the porous floor which are necessary to achieve the desired results will depend upon the characteristics of the materials being mixed. In a typical case it has been found satisfactory to supply air at a rate which produces an average air velocity from the whole of the outlet surface of the intermediate section 2 as well as of the small marginal sections 4, 4', of from 6 to 12 cm./second and an average air velocity of from 2 to 4 cm./second from the whole of the immediate side sections 3, 3'. The intermediate section 2 occupied approximately one-quarter of the total floor area and the marginal sections 4, 4' about one-tenth of said total areas.

When after complete mixing of the materials in the bunker the outlet is opened to empty the bunker, the materials are maintained either entirely or partly in an aerated state. The described floor arrangement insures substantially complete emptying, as the slope of the floor sections facilitates flow of the mixed materials towards the outlet from the remote regions of the bunker. If the materials are maintained in only partly aerated state, which is more economical in air consumption, aeration is induced firstly in the intermediate zone. The other zones are next aerated in turn causing material left therein to gravitate to the intermediate zone and thence to the outlet.

The slope of the intermediate and side sections is selected in dependence on the characteristics of the materials being mixed, and will usually be within the range of from 5° to 15°; in a typical case a slope of 9° was found to be satisfactory.

When the bunker has a large cross-sectional area it is desirable to subdivide the intermediate and the lateral floor sections into sub-sections, each provided with a separate plenum chamber and a separate valved gas-supply pipe. By this means the uniform distribution of air to the several regions of each section can be facilitated. One possible arrangement for this purpose is shown in FIGURE 4, wherein the intermediate section is a band of subsections 21 and 22, and the two side sections are bands consisting of three subsections, 31, 32, 33, and 31', 32', 33', respectively. The outermost marginal sections 41 and 41' are in this embodiment truncated, i.e., are segment-shaped except for the absence of the pointed ends.

The invention may be applied to mixing bunkers of various shapes and sizes, for example, to circular bunkers having a diameter from about 1 meter to about 5 meters.

I claim as my invention:

1. A method of mixing pulverulent materials in a bunker having a porous floor through which aerating gas is supplied upwards for aerating said materials above said floor, said method comprising the operations of:
   (a) controlling the flow of said aerating gas through an intermediate section of said floor extending substantially across the bunker to fluidize said pulverulent materials above said section throughout the height of said materials, and
   (b) simultaneously controlling the flow of said aerating gas through lateral sections of the floor situated contiguously on either side of said intermediate section to aerate the materials above said lateral sections to a lesser degree than the materials above said intermediate section.
   (c) the zones of said bunker above the said floor sections being in unrestricted lateral communication with each other, whereby said materials circulate by upflow above said intermediate section and downflow above said lateral sections.

2. A method as defined in claim 1 wherein the flow of said aerating gas through small marginal sections of said floor remote from said intermediate section is controlled to effect fluidization of said materials in the small zones at gas flow rates higher than in said marginal sections.

3. A method as defined in claim 1 wherein the horizontal area of said intermediate section is between about one-sixth to one-third of the cross-sectional area of said bunker.

4. A method as defined in claim 1 wherein the said flows of aerating gas are controlled to produce substantially constant flow rates through the several floor sections.

5. Apparatus for mixing pulverulent materials by aeration which comprises:
   (a) a bunker having confining upright walls and a porous floor through which aerating gas can ascend,
   (b) said floor being subdivided into
       (1) an intermediate section extending substantially across the bunker floor, and
       (2) lateral sections situated contiguously to said intermediate section on either side thereof,
   (c) a separate air-conducting means beneath each of said floor sections, and
   (d) means for supplying aerating gas to each of said air-conducting means at controlled rates, said supply means comprising first flow control means for feeding gas to said intermediate section at a rate to fluidize materials immediately above the intermediate section throughout the height thereof and additional flow control means for feeding gas to said lateral sections to aerate the materials immediately above said lateral sections to a lesser degree.

6. Apparatus as defined in claim 5 wherein said bunker has a substantially circular cross-section and the intermediate floor section is disposed diametrically and extends throughout the full diameter of the bunker.

7. Apparatus as defined in claim 6, wherein said floor comprises, further, a pair of small, substantially segment-shaped marginal sections situated remotely from said intermediate section, in combination with separate air-conducting means for said marginal sections and means for admitting aerating gas to said separate air-conducting means at rates to fluidize the materials immediately above said marginal sections.

8. Apparatus as defined in claim 5 wherein
(a) said intermediate section is inclined relatively to said lateral sections, sloping from a high point downwards to a low point at the wall of said confining wall, and
(b) said confining wall has an outlet situated at the said low point of the intermediate floor section.

9. Apparatus as defined in claim 8 wherein said intermediate section forms the bottom of a trough having side walls which extend upwards to the lateral sections, the depth of said trough bottom increasing toward said outlet, and the lateral sections are inclined downwardly toward the top edges of said trough side wall.

References Cited in the file of this patent

UNITED STATES PATENTS

| | | |
|---|---|---|
| 2,844,361 | Dilcher et al. | July 22, 1958 |
| 3,003,752 | Frost | Oct. 10, 1961 |

FOREIGN PATENTS

| | | |
|---|---|---|
| 543,647 | Belgium | Dec. 30, 1955 |